United States Patent [19]
Vian

[11] Patent Number: 6,164,690
[45] Date of Patent: Dec. 26, 2000

[54] STEERING WHEEL

[75] Inventor: Paolo Vian, Tregnago, Italy

[73] Assignee: Breed Automotive Technology, Inc., Lakeland, Fla.

[21] Appl. No.: 09/280,342

[22] Filed: Mar. 29, 1999

[30] Foreign Application Priority Data

May 22, 1998 [IT] Italy ................................ MI980368 U

[51] Int. Cl.⁷ .............................. B60R 21/16; B62D 1/04; G05G 1/10
[52] U.S. Cl. .......................... 280/731; 280/728.2; 74/552
[58] Field of Search ................................ 280/731, 728.2; 74/552

[56] References Cited

U.S. PATENT DOCUMENTS

| | | | |
|---|---|---|---|
| 3,819,205 | 6/1974 | Dunford et al. | 280/731 |
| 3,827,715 | 8/1974 | Lynch | 280/731 |
| 5,294,147 | 3/1994 | Edge | 280/731 |
| 5,738,369 | 4/1998 | Durrani | 280/731 |
| 5,765,861 | 6/1998 | Ricks et al. | 280/731 |
| 5,772,239 | 6/1998 | Seymour | 280/731 |
| 5,921,146 | 7/1999 | Cattaneo | 280/731 |

FOREIGN PATENT DOCUMENTS

| | | |
|---|---|---|
| 2242871 | 10/1991 | United Kingdom . |
| 2270657 | 3/1994 | United Kingdom . |

*Primary Examiner*—Brian L. Johnson
*Assistant Examiner*—Joselynn Z. Sliteris
*Attorney, Agent, or Firm*—Beth Vrioni; Lonnie R. Drayer

[57] ABSTRACT

A motor vehicle steering wheel is provided with an airbag. The steering wheel has a central part for connection to a steering wheel attachment, having a cavity for housing a module comprising an airbag, an outer ring and a plurality of substantially radial spokes connecting the outer ring to the central part of the steering wheel. The module is provided with a peripheral metal part overlapping spokes so as to give the steering wheel a sporting appearance.

4 Claims, 4 Drawing Sheets

STEERING WHEEL

FIELD OF THE INVENTION

This invention relates to a motor vehicle steering wheel of sporting appearance equipped with an airbag.

BACKGROUND OF THE INVENTION

The use of airbags for protecting the chest of motor vehicle drivers in the event of a crash is now widespread.

The increasing use of airbag devices has created a problem for steering wheel manufacturers, in particular with those intended for sporting vehicles, because the inclusion of the airbag device in steering wheels has caused the steering wheels to lose their sporting appearance and the customers for these vehicles are not pleased with this.

SUMMARY OF THE INVENTION

It is an object of this invention to provide a steering wheel of sporting appearance with an airbag.

According to this invention this object is achieved through a steering wheel provided with an airbag comprising a central part for connection to a steering wheel attachment, having a cavity housing a module comprising the airbag safety device, an outer ring and a plurality of substantially radial spokes connecting the outer ring to the central part of the steering wheel, characterised in that the plurality of spokes is covered with a peripheral metal part which is integral therewith so as to give the steering wheel a sporting appearance.

BRIEF DESCRIPTION OF THE DRAWINGS

The characteristics of this invention will be obvious from the following detailed description of an embodiment and its variants illustrated by way of nonlimiting examples in the appended drawings, in which.

DETAILED DESCRIPTION OF THE DRAWINGS

Figure 1:
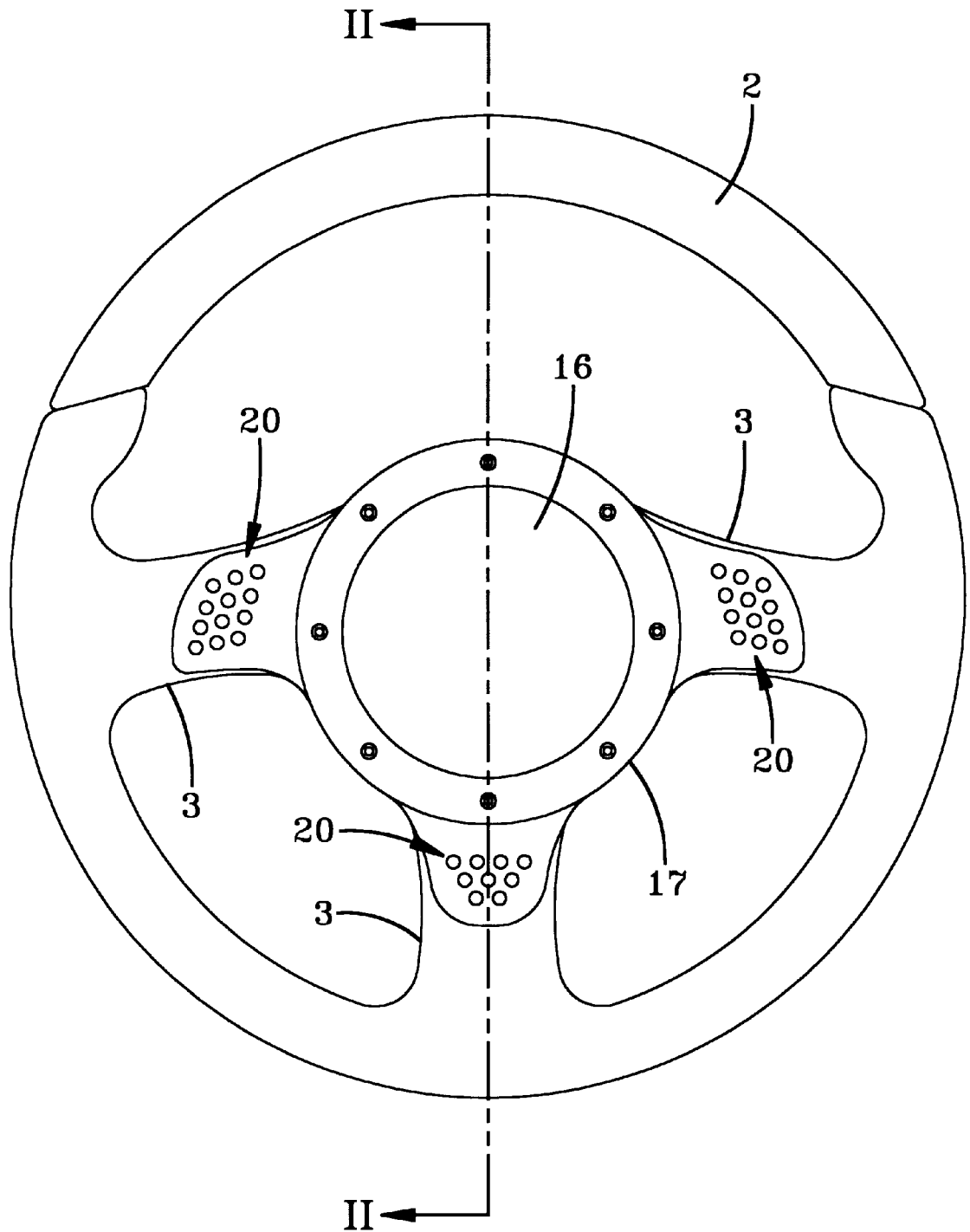
FIG. 1 shows the steering wheel according to the invention in plan from above.
Figure 2:
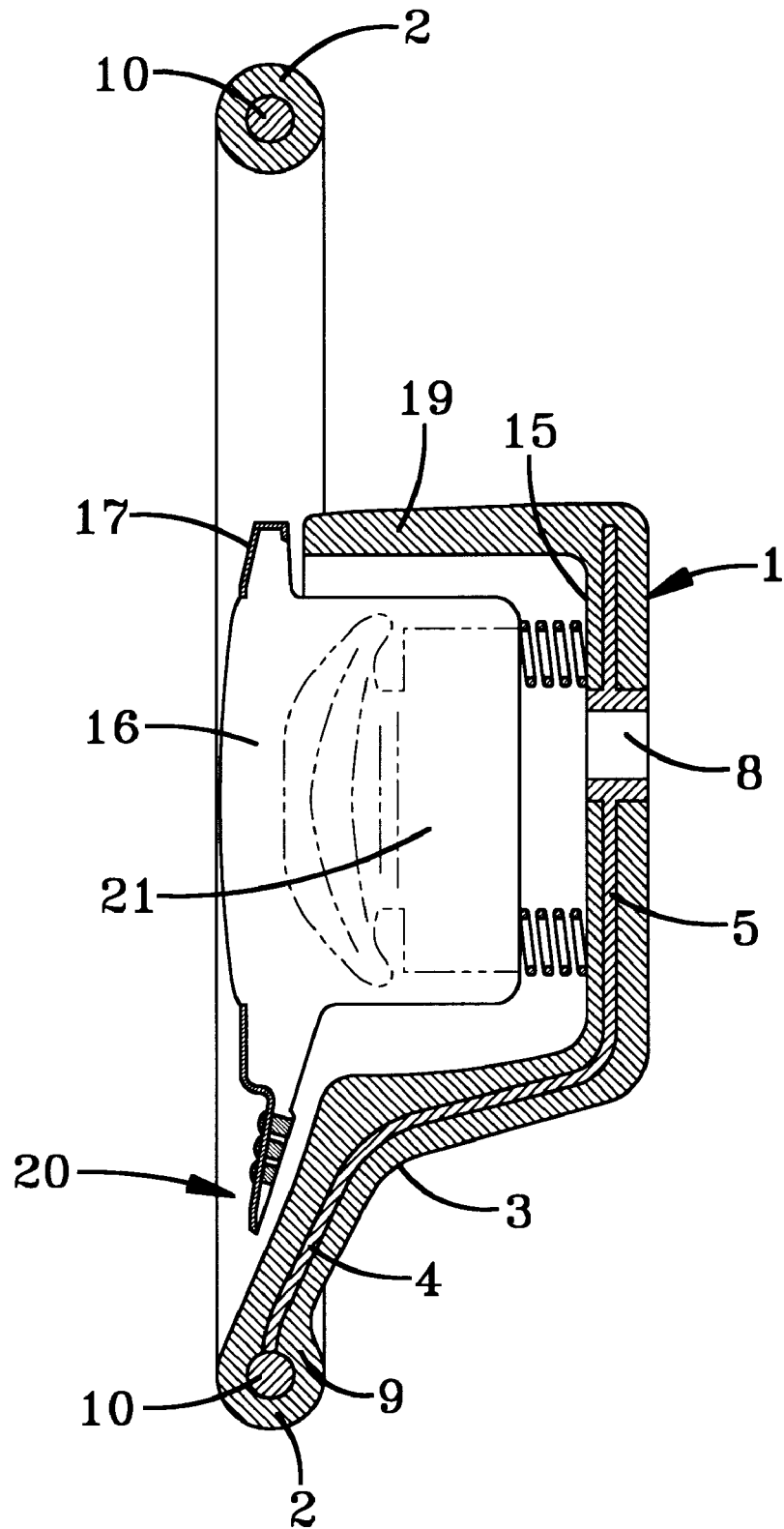
FIG. 2 shows the abovementioned steering wheel in cross-section along the line II—II in FIG. 1.

FIGS. 1 and 2 show a steering wheel essentially comprising a central part 1, an outer ring 2 and three substantially radial spokes 3 connecting the central part 1 and the ring 2.

The spokes 3 have internal thin metal cores 4 which branch out from an internal metal core 10 in the ring 2 and are connected together by a metal plate 5 (FIG. 2) which is axially displaced with respect to the ring 2 so as to form a cavity 15 which is used as a space to house a removable module 16 comprising an airbag 21.

The plate 5 has a central hole 8 (FIG. 2) for rotational coupling to a corresponding terminal portion of a motor vehicle steering column.

A covering 9 of polyurethane or the like made as a single piece covers the ring 2, the spokes 3 and the plate 5, also forming arched projections 19 laterally bounding the cavity 15.

Figure 3:
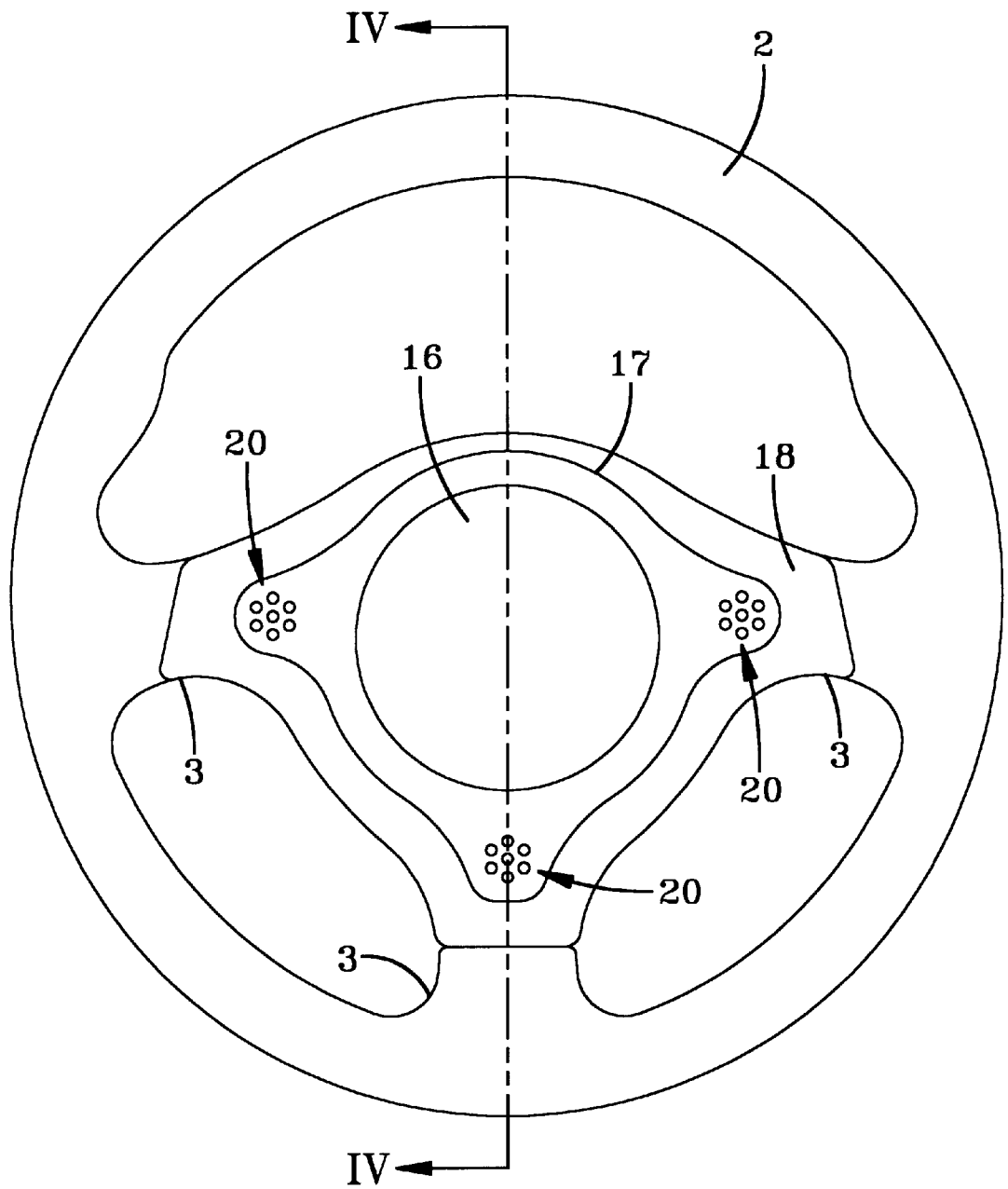
FIG. 3 shows a variant of the steering wheel according to the invention in plan from above; and, FIG. 4 shows the aforesaid steering wheel in cross-section along the line IV—IV in FIG. 3.
Figure 4:
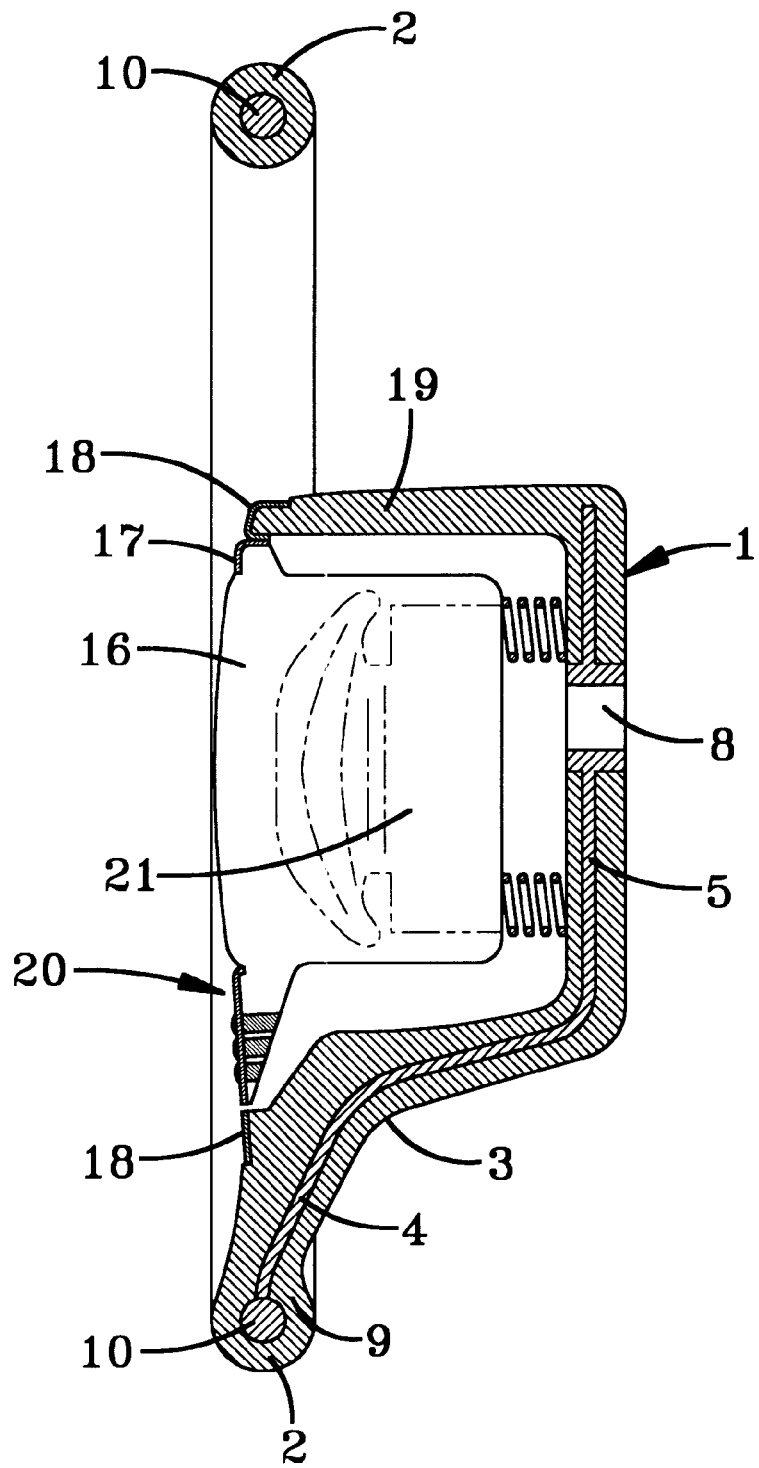

In order to confer a sporting appearance upon the steering wheel, the central module 16 comprises a metal peripheral part 17 in the shape of a circular ring with radial projections 20 overlapping the spokes 3. In a variant of the above described embodiment there is shown in FIGS. 3 and 4 a second embodiment wherein the spokes 3 have an inner part covered with projections 20 and an outer part close to their attachment to the ring 2 covered with a metal sheet 18, typically of aluminum, fixed thereto. The same metal sheet 18 also covers the arched projections 19.

Many changes and modifications in the above described embodiments of the invention can, of course, be carried out without departing from the scope thereof. Accordingly, that scope is intended to be limited only by the scope of the appended claims.

I claim:

1. A steering wheel provided with an airbag, having a cavity housing a module comprising the airbag, an outer ring and a plurality of substantially radial spokes connecting the outer ring to the central part of the steering wheel, characterized in that the module is provided with a peripheral metal part formed of a circular ring with radial projections, wherein the plurality of spokes comprises an inner part overlapped by the radial projections and an outer part of the plurality of spokes is covered with a metal sheet fixed thereto.

2. The steering wheel according to claim 1, wherein the metal sheet also covers arched projections of the central part that laterally bound the housing cavity.

3. The steering wheel according to claim 2, wherein the metal sheet is aluminum.

4. The steering wheel according to claim 1, wherein the metal sheet is aluminum.

* * * * *